(12) United States Patent
Polcyn et al.

(10) Patent No.: US 9,604,875 B2
(45) Date of Patent: Mar. 28, 2017

(54) TEMPERED AND NON-TEMPERED GLASS COATINGS HAVING SIMILAR OPTICAL CHARACTERISTICS

(71) Applicant: PPG INDUSTRIES OHIO, INC., Cleveland, OH (US)

(72) Inventors: Adam D. Polcyn, Pittsburgh, PA (US); Andrew V. Wagner, Pittsburgh, PA (US); Martin Cunningham, Wichita Falls, TX (US); David L. Szypulski, Lower Burrell, PA (US)

(73) Assignee: Vitro, S.A.B. de C.V., Nuevo León (MX)

( * ) Notice: Subject to any disclaimer, the term of this patent is extended or adjusted under 35 U.S.C. 154(b) by 0 days.

(21) Appl. No.: 14/519,268

(22) Filed: Oct. 21, 2014

(65) Prior Publication Data

US 2015/0191393 A1    Jul. 9, 2015

Related U.S. Application Data

(60) Division of application No. 14/204,392, filed on Mar. 11, 2014, now Pat. No. 8,865,325, and a
(Continued)

(51) Int. Cl.
*B32B 15/04* (2006.01)
*B32B 17/06* (2006.01)
(Continued)

(52) U.S. Cl.
CPC .......... *C03C 17/3639* (2013.01); *C03B 33/02* (2013.01); *C03C 17/36* (2013.01);
(Continued)

(58) Field of Classification Search
USPC ....... 428/432, 688, 689, 699, 701, 702, 426, 428/434, 697
See application file for complete search history.

(56) References Cited

U.S. PATENT DOCUMENTS 6,353,501 B1 * 3/2002 Woodruff et al. ............ 359/585
6,391,462 B1 * 5/2002 Jang .............................. 428/432
(Continued)

FOREIGN PATENT DOCUMENTS

JP       2001-353810      * 12/2001

OTHER PUBLICATIONS

Nakamura (JP 2001-353810) English machine translation.*

*Primary Examiner* — Lauren R Colgan
(74) *Attorney, Agent, or Firm* — Andrew C. Siminerio

(57) ABSTRACT

Temperable and non-temperable coatings are provided which have similar optical characteristics. The non-temperable coating is placed on glass that is not to be tempered and provides certain optical characteristics. The temperable coating is placed on a glass substrate and the coated substrate is then tempered. After tempering, the coated tempered glass sheet and the coated non-tempered glass sheet have similar optical characteristics. Both coatings have a plurality of metal layers, with at least one of the metallic layers being a discontinuous layer with a primer layer over the discontinuous metal layer. For the non-temperable coating, the discontinuous metal layer has an effective thickness in the range of 1.5 nm to 1.7 nm. For the temperable coating, the discontinuous metal layer has an effective thickness in the range of 1.7 nm to 1.8 nm. The primer layer of the temperable coating is thinner than the primer layer of the non-temperable coating.

13 Claims, 3 Drawing Sheets

Related U.S. Application Data continuation-in-part of application No. 13/072,866, filed on Mar. 28, 2011.

(60) Provisional application No. 61/777,163, filed on Mar. 12, 2013, provisional application No. 61/318,471, filed on Mar. 29, 2010.

(51) Int. Cl.
*C03C 17/36* (2006.01)
*C03B 33/02* (2006.01)

(52) U.S. Cl.
CPC ........ *C03C 17/366* (2013.01); *C03C 17/3618* (2013.01); *C03C 17/3644* (2013.01); *C03C 17/3681* (2013.01); *C03C 2217/42* (2013.01); *Y10T 83/04* (2015.04); *Y10T 428/24851* (2015.01); *Y10T 428/24868* (2015.01)

(56) References Cited

U.S. PATENT DOCUMENTS

| | | | |
|---|---|---|---|
| 2004/0009356 A1* | 1/2004 | Medwick et al. | 428/432 |
| 2004/0033384 A1* | 2/2004 | Funkenbusch | H05K 9/0094 428/626 |
| 2007/0242359 A1* | 10/2007 | Thielsch et al. | 359/585 |
| 2008/0174872 A1* | 7/2008 | Morimoto et al. | 359/585 |
| 2009/0297864 A1* | 12/2009 | Lingle et al. | 428/432 |
| 2010/0046191 A1* | 2/2010 | den Boer et al. | 361/818 |
| 2011/0169402 A1* | 7/2011 | Lingle et al. | 313/582 |

\* cited by examiner

TEMPERED AND NON-TEMPERED GLASS COATINGS HAVING SIMILAR OPTICAL CHARACTERISTICS

CROSS REFERENCE TO RELATED APPLICATION

This application is a divisional of U.S. application Ser. No. 14/204,392 (now U.S. Pat. No. 8,865,325, issued Oct. 21, 2014), which claimed priority to U.S. Provisional Application No. 61/777,163, filed Mar. 12, 2013, and which was a continuation-in-part of U.S. application Ser. No. 13/072,866, filed Mar. 28, 2011, which claimed priority to U.S. Provisional Application No. 61/318,471, filed Mar. 29, 2010, all of which applications are herein incorporated by reference in their entirety.

BACKGROUND OF THE INVENTION

Field of the Invention

This invention relates generally to architectural transparencies and, more particularly, to tempered and non-tempered coated glass substrates (temperable and non-temperable coatings) having similar optical characteristics.

Technical Considerations

As will be appreciated by one skilled in the architectural art, glass is used typically in either a tempered form or a non-tempered (annealed) form, depending upon the desired final use of the glass, For annealed glass, the glass is heated to the annealing point of the glass and then allowed to slowly cool to below the strain point of the glass. The annealed glass can be cut to desired final dimensions, such as for a door, window, and the like. For even stronger glass, tempering is used. In tempering, glass is heated above the annealing point of the glass and then rapidly cooled, such as by directing a cooling medium at the glass, to provide the glass with an exterior compressive force and an interior tensile force. Tempered glass is much stronger than annealed glass and is used where safety is an important factor. However, unlike annealed glass, tempered glass cannot be cut or it will shatter. Therefore, where tempered glass is desired, the glass must be cut to the desired final dimensions before tempering.

Solar control coatings are known in the field of architectural transparencies. Solar control coatings block or filter selected ranges of electromagnetic radiation, such as in the solar infrared or solar ultraviolet ranges, to reduce the amount of solar energy entering the building. This reduction of solar energy transmittance helps reduce the load on the cooling units of the building. In some architectural applications, it may be desirable to have a reflective outer surface so as to decrease visibility into the building to retain as much privacy as possible, while still allowing visible light to enter the building and also allowing the workers inside the building to see out.

A conventional building may require both annealed (non-tempered) and tempered glass pieces with solar control coatings. For example, annealed glass with a solar control coating may be used on the lower floors while tempered glass with a solar control coating is used on the upper floors for increased safety. Both the coated annealed glass and the coated tempered glass should have the same or very similar optical characteristics so that the building maintains the same overall aesthetic appearance. This causes a problem for coated glass manufacturers.

Most glass manufacturers sell large sheets of coated annealed glass to glass suppliers. The suppliers cut the glass sheets to desired dimensions, such as for doors, windows, etc., and sell the cut glass to a customer. However, for tempered glass orders, the glass suppliers must cut the coated annealed large glass sheet to smaller pieces of a desired final dimension and then temper the smaller coated glass pieces (i.e. subjecting the coating to additional heating and rapid cooling steps). Tempering the coated glass pieces can result in the tempered products having different color or optical characteristics than the original annealed products due to changes in the coating caused by the extra heating and rapid cooling steps required to temper the glass. This difference in color or other optical properties, such as transmittance or reflectance, between the coated tempered glass and the coated annealed glass is not desirable if the annealed and tempered products are to be used in the same building. Also, the coating on the tempered product may become hazy due to the high temperatures and rapid cooling required for the tempering process. This haze is aesthetically undesirable.

It would be desirable for glass manufacturers to provide glass suppliers with at least two types of coated (annealed) glass sheets, one that could be cut and sold as is for annealed applications (i.e. having a non-temperable coating) and another that could be cut into smaller pieces and then subsequently tempered (temperable coating) but which, after tempering, has the same or substantially the same aesthetic and optical characteristics as the non-temperable glass so that the two types of coated glass could be used in the same building.

SUMMARY OF THE INVENTION

A coated article comprises a substrate and a coating stack over at least a portion of the substrate. The coating stack comprises a first dielectric layer; a first continuous metal layer over at least a portion of the first dielectric layer; a first primer layer over the first continuous metal layer; a second dielectric layer over at least a portion of the first primer layer; a second discontinuous metal layer over at least a portion of the second dielectric layer; a second primer layer over at least a portion of the second discontinuous metal layer; a third dielectric layer over at least a portion of the second primer layer; a third continuous metal layer over at least a portion of the third dielectric layer; a third primer layer over at least a portion of the third continuous metal layer; and an outermost protective coating over at least a portion of the third primer layer. When the coating is a non-temperable coating, the second discontinuous metal layer has effective thickness in the range of 1 nm to 2 nm, such as 1.2 nm to 1.8 nm, such as 1.3 nm to 1.7 nm, such as 1.5 nm to 1.7 nm. When the coating is a temperable coating, the second discontinuous metal layer has an effective thickness in the range of 1.3 rim to 2.1 nm, such as 1.5 nm to 2 nm, such as 1.7 nm to 1.8 nm, such as 1.6 nm to 2.1 nm, such as 1.8 nm to 2.1 nm. The second primer layer of the temperable coating is thinner than the second primer layer of the annealed glass sheets. The discontinuous layer of the temperable coating has a higher effective thickness than the non-temperable coating.

A method of providing glass sheets includes providing at least one glass sheet having a coating with a plurality of metal layers. At least one of the metallic layers is a discontinuous layer with a primer layer over the discontinuous metal layer. When the coating is a non-temperable coating, the discontinuous metal layer has an effective thickness in the range of 1 nm to 2 nm, such as 1.2 nm to 1.8 nm, such as 1.3 nm to 1.7 nm, such as 1.5 nm to 1.7 nm. When the coating is a temperable coating, the discontinuous metal layer has an effective thickness in the range of 1.3 nm to 2.1 nm, such as 1.5 nm to 2 nm, such as 1.7 nm to 1.5 nm. The primer layer of the temperable coating is thinner than the primer layer of the non-temperable coating. The discontinuous layer of the temperable coating has a higher effective thickness than the non-temperable coating.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
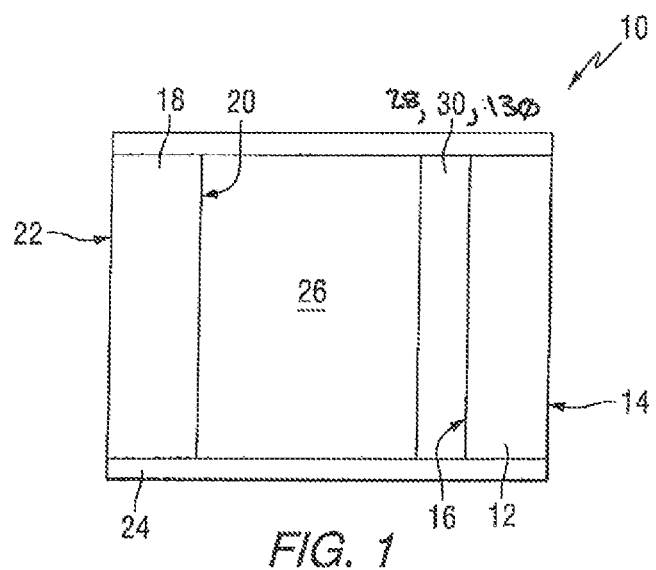
FIG. 1 is a side view (not to scale) of an insulating glass unit (IGU) having a coating of the invention.
Figure 3:
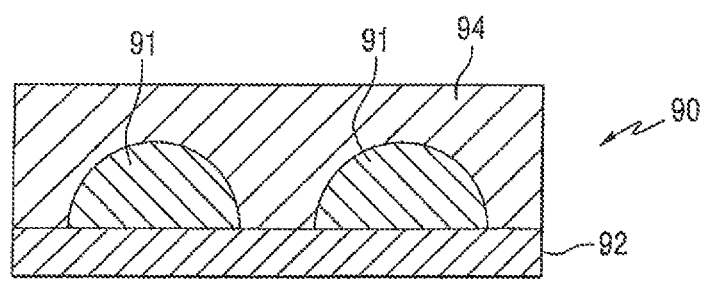
FIG. 3 is a side, sectional view (not to scale) of a subcritical metal layer with a primer layer.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands. The terms "annealed coating" or "non-temperable coating" refer to a coating which is designed to be used on annealed glass for final use but not to be tempered. The terms "temperable coating" or "tempered coating" refer to a coating designed to undergo a tempering process for use on tempered glass for final use.

For purposes of the following discussion, the invention will be discussed with reference to use with an architectural transparency, such as, but not limited to, an insulating glass unit (IGU). As used herein, the term "architectural transparency" refers to any transparency located on a budding, such as, but not limited to, windows and sky lights. However, it is to be understood that the invention is not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles. Therefore, it is to be understood that the specifically disclosed exemplary embodiments are presented simply to explain the general concepts of the invention, and that the invention is not limited to these specific exemplary embodiments. Additionally, while a typical "transparency-"can have sufficient visible light transmission such that materials can be viewed through the transparency, in the practice of the invention, the "transparency" need not be transparent to visible light but may be translucent or opaque.

A non-limiting transparency 10 incorporating features of the invention is illustrated in FIG. 1. The transparency 10 can have any desired visible light, infrared radiation, or ultraviolet radiation transmission and/or reflection. For example, the transparency 10 can have a visible light transmission of any desired amount, e.g., greater than 0% up to 100%, The exemplary transparency 10 of FIG. 1 is in the form of a conventional insulating glass unit and includes a first ply 12 with a first major surface 14 (No. 1 surface) and an opposed second major surface 16 (No. 2 surface). In the illustrated non-limiting embodiment, the first major surface 14 faces the building exterior, i.e., is an outer major surface, and the second major surface 16 faces the interior of the building. The transparency 10 also includes a second ply 18 having an outer (first) major surface 20 (No. 3 surface) and an inner (second) major surface 22 (No. 4 surface) and spaced from the first ply 12. This numbering of the ply surfaces is in keeping with conventional practice in the fenestration art. The first and second plies 12, 18 can be connected together in any suitable manner, such as by being adhesively bonded to a conventional spacer frame 24. A gap or chamber 26 is formed between the two plies 12, 18. The chamber 26 can be filled with a selected atmosphere, such as air, or a non-reactive gas such as argon or krypton gas. A solar control coating 28 (any of the coatings described below) is formed over at least a portion of one of the piles 12, 18, such as, but not limited to, over at least a portion of the No. 2 surface 16 or at least a portion of the No. 3 surface 20. The coating could alternatively be on the No. 1 surface or the No. 4 surface, if desired.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmission of greater than 0% up to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon.

The first and second plies 12, 18 can each be, for example, clear float glass or can be tinted or colored glass or one ply 12, 18 can be clear glass and the other ply 12, 18 colored glass. The first and second plies 12, 18 can be of any desired dimensions, e.g., length, width, shape, or thickness. In one exemplary automotive transparency, the first and second plies can each be 1 mm to 10 mm thick, such as 1 mm to 8 mm thick, such as 2 mm to 8 mm, such as 3 mm to 7 mm, such as 6 mm to 7 mm, such as 6 mm thick. Non-limiting examples of glass that can be used for the practice of the invention include clear glass, Starphire®, Solargreen®, Solextra®, GL-20®, GL-38™, Solarbronze, Solargray® glass, Pacifica® glass, SolarBlue® glass, and Optiblue® glass, all commercially available from PPG Industries Inc. of Pittsburgh, Pa.

A solar control coating 28 of the invention (either a non-temperable coating 30 or a temperable coating 130 as described below) is located over at least a portion of at least one major surface of one of the glass plies 12, 18. In the example shown in FIG. 1, the coating 28 is formed over at least a portion of the inner surface 16 of the outboard glass ply 12 (No. 2 surface). As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating 28 can block, absorb, or filter selected portions of the solar spectrum, such as, but not limited to, the IR, UV, and/or visible spectrums.

The solar control coating 28 can be deposited onto the glass ply 12 prior to being incorporated into the transparency 10 in any conventional method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. in one non-limiting embodiment, the coating 28 can be deposited by MSVD. Examples of MSVD coating devices and methods will be well understood by one of ordinary skill in the art.

Non-Temperable Coating

Figure 2:
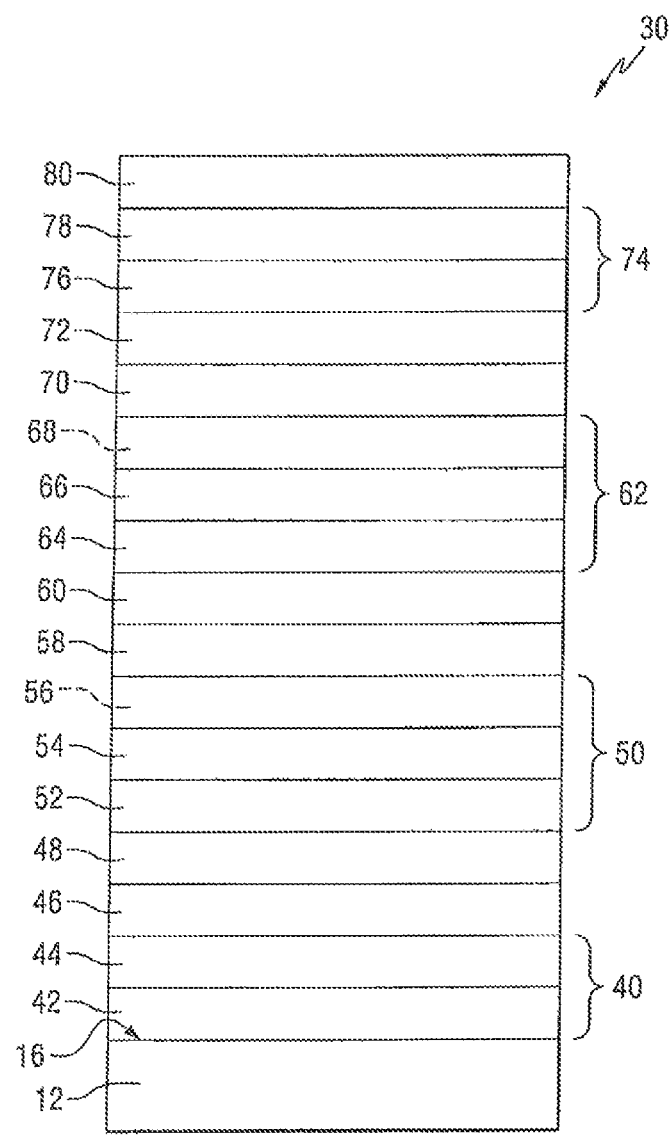
FIG. 2 is a side view (not to scale) of a coating incorporating features of the invention for annealed glass applications (i.e. a non-temperable coating)

An exemplary non-temperable coating 30 of the invention is shown in FIG. 2. This exemplary coating 30 includes a base layer or first dielectric layer 40 deposited over at least a portion of a major surface of a substrate (e.g., the No. 2 surface 16 of the first ply 12). The first dielectric layer 40 can be a single layer or can comprise more than one film of antireflective materials and/or dielectric materials, such as, but not limited to, metal oxides, oxides of metal alloys, nitrides, oxynitrides, or mixtures thereof. The first dielectric layer 40 can be transparent to visible light. Examples of suitable metal oxides for the first dielectric layer 40 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 40 can be a substantially single phase film, such as a metal alloy oxide film, e.g., zinc stannate, or can be a mixture of phases composed of zinc and tin oxides or can be composed of a plurality of films.

For example, the first dielectric layer 40 (whether a single film or multiple film layer) can have a thickness in the range of 10 nanometers (nm) to 35 nm, such as 15 nm to 30 nm, such as 20 nm to 30 nm, such as 25 nm to 30 nm.

The first dielectric layer 40 can comprise a multi-film structure having a first film 42, e.g., a metal alloy oxide film, deposited over at least a portion of a substrate (such as the inner major surface 16 of the first ply 12) and a second film 44, e.g., a metal oxide or oxide mixture film, deposited over the first metal alloy oxide film 42. In one non-limiting embodiment, the first film 42 can be a zinc/tin alloy oxide. By "zinc/tin alloy oxide" is meant both true alloys and also mixtures of the oxides. The zincitin alloy oxide can be that obtained from magnetron sputtering vacuum deposition from a cathode of zinc and tin. One non-limiting cathode can comprise zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. One suitable metal alloy oxide that can be present in the first film 42 is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example, where x=2/3, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film.

The second film 44 can be a metal oxide film, such as zinc oxide. The zinc oxide film can be deposited from a zinc cathode that includes other materials to improve the sputtering characteristics of the cathode. For example, the zinc cathode can include a small amount (e.g., up to 15 wt. %, such as up to 10 wt. %, such as up to 5 wt. %) of tin to improve sputtering. In which case, the resultant zinc oxide film would include a small percentage of tin oxide, e.g., up to 15 wt. %, e.g., up to 10 wt. % tin oxide, e.g., up to 5 wt. % tin oxide. A coating layer deposited from a zinc cathode having 15 wt. % tin or less (added to enhance the conductivity of the cathode) is referred to herein as "a zinc oxide film" even though a small amount of tin oxide may be present. The small amount of tin in the cathode (e.g., less than or equal to 16 wt. %, such as less than or equal to 10 wt. %, such as less than or equal to 5 wt. %) is believed to form tin oxide in the predominantly zinc oxide second film 44.

For example, the first film 42 can be zinc stannate and the second film 44 can be zinc oxide (for example, 90 wt. % zinc oxide and 10 wt. % tin oxide).

The first film 42 can have a thickness in the range of 10 nm to 35 nm, such as 15 nm to 30 nm, such as 20 nm to 25 nm, such as 23 nm.

The second film 44 can have a thickness in the range of 2 nm to 10 nm, such as 3 nm to 10 nm, such as 4 nm to 9 nm, such as 5 nm to 7 nm, such as 6 nm.

A first heat and/or radiation reflective metallic layer 46 can be deposited over the first dielectric layer 40. The first reflective layer 46 can include a reflective metal, such as, but not limited to, metallic gold, copper, palladium, aluminum, silver, or mixtures, alloys, or combinations thereof. In one embodiment, the first reflective layer 46 comprises a metallic silver layer having a thickness in the range of 10 nm to 20 nm, such as 10 nm to 15 nm, such as 12 nm to 15 nm, such as 13 nm to 15 nm, such as 14.1 nm. The first metallic layer 46 is a continuous layer. By "continuous layer" is meant that the coating forms a continuous film of the material and not isolated coating regions.

A first primer layer 48 is located over the first reflective layer 46. The first primer layer 48 can be a single film or a multiple film layer. The first primer layer 48 can include an oxygen-capturing material that can be sacrificial during the deposition process to prevent degradation or oxidation of the first reflective layer 45 during the sputtering process or subsequent heating processes. The first primer layer 48 can also absorb at least a portion of electromagnetic radiation, such as visible light, passing through the coating 30. Examples of materials useful for the first primer layer 48 include titanium, silicon, silicon dioxide, silicon nitride, silicon oxynitride, nickel-chrome alloys (such as Inconel), zirconium, aluminum, alloys of silicon and aluminum, alloys containing cobalt and chromium (e.g., Stellite®), and mixtures thereof. For example, the first primer layer 48 can have a thickness in the range of 1 nm to 6 nm, such as 1 nm to 4 nm, such as 2 nm to 4 nm, such as 3 nm to 3.5 nm.

A second dielectric layer 50 is located over the first reflective layer 46 (e.g., over the first primer layer 48). The second dielectric layer 50 can comprise one or more metal oxide or metal alloy oxide-containing films, such as those described above with respect to the first dielectric layer 40. For example, the second dielectric layer 50 can include a first metal oxide film 52, e.g., a zinc oxide film, deposited over the first primer film 48 and a second metal alloy oxide film 54, e.g., a zinc stannate ($Zn_2SnO_4$) film, deposited over the first zinc oxide film 52. A third metal oxide film 56, e.g., another zinc oxide layer, can be deposited over the zinc stannate layer.

The second dielectric layer 50 can have a total thickness (e.g., the combined thicknesses of the layers) in the range of 20 nm to 60 nm, such as 20 nm to 50 nm, such as 30 nm to 50 nm, such as 40 nm to 50 nm, such as 41 nm to 47 nm.

For example, for a multi-film layer, the first metal oxide film 52 and second metal oxide film 56 can have a thickness in the range of 1 nm to 15 nm, such as 2 nm to 10 nm, such as 3 nm to 8 nm, such as 5 nm to 7 nm. The first and second metal oxide films do not have to be of the same thickness. The metal alloy oxide layer 54 can have a thickness in the range of 10 nm to 35 nm, such as 15 nm to 35 nm, such as 20 nm to 35 nm, such as 25 nm to 39 nm, such as 29 nm.

A subcritical thickness (discontinuous) second metallic layer 58 is located over the second dielectric layer 50 (e.g., over the second zinc oxide film 56, if present, or over the zinc stannate film 54 if not). The metallic material, such as, but not limited to, metallic gold, copper, palladium, aluminum, silver, or mixtures, alloys, or combinations thereof, is applied at a subcritical thickness such that isolated regions or islands of the material are formed rather than a continuous layer of the material. For silver, it has been determined that the critical thickness is less than 5 nm, such as less than 4 nm, such as less than 3 nm, such as less than 2.5 nm, For silver, the transition between a continuous layer and a subcritical layer occurs in the range of 2.5 nm to 5 nm. It is estimated that copper, gold, and palladium would exhibit similar subcritical behavior in this range. The second metallic layer 58 can include any one or more of the materials described above with respect to the first reflective layer 46 but these materials are not present as a continuous film. In one non-limiting embodiment, the second layer 58 comprises metallic islands having an effective thickness (as described below) in the range of 1 nm to 3 nm, such as 1 nm to 2 nm, such as 1.6 nm. The subcritical metallic layer 58 absorbs electromagnetic radiation according to the Plasmon Resonance Theory. This absorption depends at least partly on the boundary conditions at the interface of the metallic islands. The subcritical metallic layer 58 is not an infrared reflecting layer, like the first metallic layer 46. The subcritical layer 58 is not a continuous layer. It is estimated that for silver, metallic islands or balls of silver metal are deposited below the subcritical thickness.

A second primer layer 60 can be deposited over the second metallic layer 58. The second primer layer 60 can be as described above with respect to the first primer layer 48. In one example, the second primer layer 60 has a thickness in the range of 1 nm to 6 nm, such as 1 nm to 4 nm, such as 2 nm to 4 nm, such as 3 nm to 3.5 nm.

A third dielectric layer 62 can be deposited over the second metallic layer 58 (e.g., over the second primer film 60). The third dielectric layer 62 can also include one or more metal oxide or metal alloy oxide-containing layers, such as discussed above with respect to the first and second dielectric layers 40, 50. In one example, the third dielectric layer 62 is a multi-film layer similar to the second dielectric layer 50, For example, the third dielectric layer 62 can include a first metal oxide layer 64, e.g., a zinc oxide layer, a second metal alloy oxide-containing layer 66, e.g., a zinc stannate layer deposited over the zinc oxide layer 64, and a third metal oxide layer 68, e.g., another zinc oxide layer, deposited over the zinc stannate layer 66. In one example, the metal oxide layers 64, 68 have a thickness in the range of 1 nm to 10 nm, such as 2 nm to 8 nm, such as 3 nm to 6 nm, such as 4 nm to 5 nm.

In one example, the total thickness of the third dielectric layer 62 (e.g., the combined thicknesses of the metal oxide and metal alloy oxide layers) is in the range of 20 nm to 50 nm, such as 25 nm to 45 nm, such as 30 nm to 45 nm, such as 40 nm to 45 nm, such as 43 nm.

A third heat and/or radiation reflective metallic layer 70 is deposited over the third dielectric layer 62. The third reflective layer 70 can be of any of the materials discussed above with respect to the first reflective layer. In one non-limiting example, the third reflective layer 70 has a thickness in the range of 10 nm to 20 nm, such as 12 nm to 18 nm, such as 13 nm to 15 nm, such as 14 nm to 15 nm, such as 14.1 nm. The third metallic layer is a continuous layer.

A third primer layer 72 is located over the third reflective layer 70. The third primer layer 72 can be as described above with respect to the first or second primer layers. In one non-limiting example, the third primer layer has a thickness in the range of 1 nm to 5 nm, such as 1 nm to 3 nm, such as 2 nm.

A fourth dielectric layer 74 is located over the third reflective layer (e.g., over the third primer layer 72). The fourth dielectric layer 74 can be comprised of one or more metal oxide or metal alloy oxide-containing layers, such as those discussed above with respect to the first, second, or third dielectric layers 40, 50, 62. In one non-limiting example, the fourth dielectric layer 74 is a multi-film layer having a first metal oxide layer 76, e.g., a zinc oxide layer, deposited over the third primer film 72, and a second metal alloy oxide layer 78, e.g., a zinc stannate layer, deposited over the zinc oxide layer 76. In one non-limiting embodiment, the metal oxide layer 76 can have a thickness in the range of 1 nm to 10 nm, such as 2 nm to 10 nm, such as 5 nm to 10 nm, such as 6 nm to 8 nm, such as 7 nm. The metal alloy oxide layer 78 can have a thickness in the range of 10 nm to 25 nm, such as 10 nm to 20 nm, such as 15 nm to 20 nm, such as 18 nm.

In one example, the total thickness of the fourth dielectric layer 74 (e.g., the combined thicknesses of the metal oxide and metal alloy oxide layers) is in the range of 10 nm to 30 nm, such as 15 nm to 30 nm, such as 20 nm to 30 nm, such as 25 nm.

An overcoat 80 can be located over the fourth dielectric layer 74. The overcoat 80 can help protect the underlying coating layers from mechanical and chemical attack. The overcoat 80 can be, for example, a metal oxide or metal nitride layer. For example, the overcoat 80 can have a thickness in the range of 2 nm to 8 nm, such as 2 nm to 6 nm, such as 4 nm to 5 nm, such as 4.5 nm. In a preferred embodiment, the overcoat 80 comprises titania. Other materials useful for the overcoat include other oxides, such as silica, alumina, or a mixture of silica and alumina.

Temperable Coating

Figure 4:
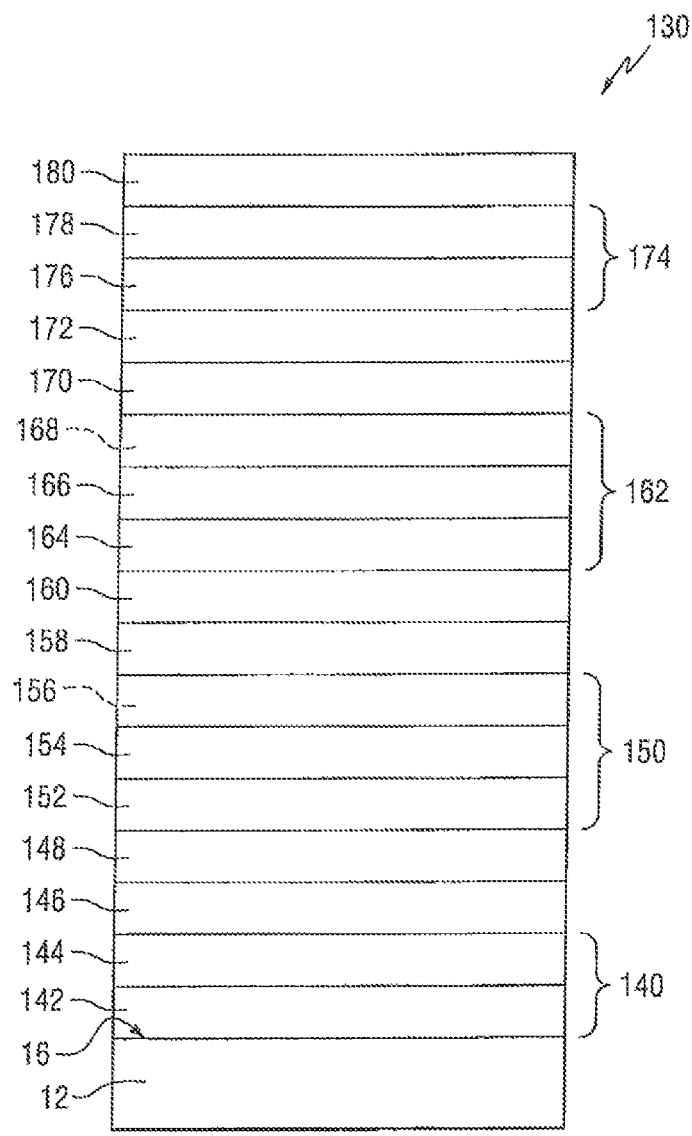
FIG. 4 is a side view (not to scale) of another coating incorporating features of the invention for tempered glass applications (i.e. a temperable coating).

A tempered (or temperable) coating 130 of the invention is shown in FIG. 4. The temperable coating 130 includes a base layer or first dielectric layer 140 deposited over at least a portion of a major surface of a substrate (e.g., the No. 2 surface 16 of the first ply 12). The first dielectric layer 140 can be similar to the first dielectric layer 40 described above. For example, the first dielectric layer 140 (whether a single film or multiple film layer) can have a thickness in the range of 10 nm to 40 nm, such as 15 nm to 35 nm, such as 20 nm to 30 nm, such as 27 nm.

The first dielectric layer 140 can comprise a multi-film structure having a first film 142, e.g., a metal alloy oxide film, and a second film 144, e.g., a metal oxide or oxide mixture film, deposited over the first metal alloy oxide film 142. In one non-limiting embodiment, the first film 142 can be zinc stannate.

For example, the first film 142 can be zinc stannate and the second film 144 can be zinc oxide (for example, 90 wt. % zinc oxide and 10 wt. % tin oxide).

For example, the first film 142 can comprise a metal alloy oxide having a thickness in the range of 10 nm to 30 nm, such as 15 nm to 25 nm, such as 20 nm.

The second film 144 can comprise metal oxide having a thickness in the range of 1 nm to 15 nm, such as 2 nm to 10 nm, such as 5 nm to 10 nm, such as 6 nm to 8 nm, such as 7 nm.

A first heat and/or radiation reflective metallic layer 146 can be deposited over the first dielectric layer 140. The first reflective layer 146 can include a reflective metal, such as described above. In one embodiment, the first reflective layer 46 comprises a continuous metallic layer having a thickness in the range of 10 nm to 20 nm, such as 10 nm to 15 nm, such as 13 nm to 16 nm, such as 14 nm to 15 nm, such as 14.8 nm.

A first primer layer 148 is located over the first reflective layer 146. The first primer layer 148 can be a single film or a multiple film layer, as described above. For example, the first primer layer 148 can have a thickness in the range of 1 nm to 6 nm, such as 2 nm to 4 nm, such as 2 nm to 3 nm, such as 3 nm to 3.5 nm. In one example, the first primer 148 is titanium.

A second dielectric layer 150 is located over the first reflective layer 146 (e.g., over the first primer layer 48). The second dielectric layer 150 can comprise one or more metal oxide or metal alloy oxide-containing films, such as those described above with respect to the first dielectric layer 140. For example, the second dielectric layer 150 can include a first metal oxide film 152, e.g., a zinc oxide film, deposited over the first primer film 146 and a second metal alloy oxide film 154, e.g., a zinc stannate ($Zn_2SnO_4$) film, deposited over the first zinc oxide film 152. A third metal oxide film 156, e.g., another zinc oxide layer, can be deposited over the metal alloy oxide layer.

The second dielectric layer 150 can have a total thickness (e.g., the combined thicknesses of the layers if more than one layer is present) in the range of 30 nm to 50 nm, such as 35 nm to 50 nm, such as 40 nm to 50 nm, such as 47 nm.

For example, for a multi-film layer, the first metal oxide film 152 and second metal oxide film 156, can have a thickness in the range of 1 nm to 10 nm, such as 2 nm to 8 nm, such as 3 nm to 7 nm, such as 5 nm to 6 nm. The first and second metal oxide layers do not have to be of the same thickness.

A subcritical (discontinuous) metallic layer 158 is located over the second dielectric layer 150 (e.g., over the second metal oxide film 156). The second metallic layer 158 can include any one or more of the metallic materials described above with respect to the first reflective layer 146. In one non-limiting embodiment, the second metallic layer 158 comprises sanded metal with the islands having an effective thickness (as described below) in the range of 1 nm to 3 nm, such as 1 nm to 2 nm, such as 1.5 nm to 1.9 nm, such as 1.6 nm to 1.8 nm, such as 1.7 nm to 1.8 nm, such as 1.75 nm. As will be appreciated, the effective thickness of the tempered coating can be greater than that of the annealed coating.

A second primer layer 160 can be deposited over the second metallic layer 158. The second primer layer 160 can be as described above with respect to the first primer layer 148. For example, the second primer layer can have a thickness in the range of 1 nm to 5 nm, such as 1 nm to 4 nm, such as 1.5 nm to 4 nm, such as 1.8 nm to 3.5 nm, such as 1.8 nm to 3 nm, such as 1.8 nm to 2.1 nm. The second primer layer 160 can be thinner than the second primer layer of the annealed coating 30.

A third dielectric layer 162 can be deposited over the second reflective layer 158 (e.g., over the second primer layer 160). The third dielectric layer 162 can also include one or more metal oxide or metal alloy oxide-containing layers, such as discussed above with respect to the first and second dielectric layers 140, 150. In one example, the third dielectric layer 162 is a multi-film layer similar to the second dielectric layer 150. For example, the third dielectric layer 162 can include a first metal oxide layer 164, e.g., a zinc oxide layer, a second metal alloy oxide-containing layer 165, e.g., a zinc stannate layer deposited over the metal oxide layer 164, and a third metal oxide layer 168, e.g., another zinc oxide layer, deposited over the zinc stannate layer 166. In one example, the metal oxide layers 164, 168 have a thicknesses in the range of 1 nm to 8 nm, such as 2 nm to 7 nm, such as 2 nm to 6 nm, such as 3 nm to 5 nm, such as 3 nm to 4 nm. The metal alloy oxide layer 166 can have a thickness in the range of 20 nm to 40 nm, such as 25 nm to 35 nm, such as 30 nm to 35 nm, such as 32 nm.

In one example, the total thickness of the third dielectric layer 162 (e.g., the combined thicknesses of the metal oxide and metal alloy oxide layers) is in the range of 20 nm to 45 nm, such as 30 nm to 40 nm, such as 35 nm to 40 nm, such as 39 nm.

A third heat and/or radiation reflective metallic layer 170 is deposited over the third dielectric layer 162. The third reflective layer 170 can be of any of the materials discussed above with respect to the first and second reflective layers. In one non-limiting example, the third reflective layer 170 has a thickness in the range of 10 nm to 20 nm, such as 12 nm to 18 nm, such as 12 nm to 16 nm, such as 14 nm to 15.5 nm, such as 14.5 to 15 nm, such as 14.8 nm. The third metallic layer 170 is a continuous layer.

A third primer layer 172 is located over the third reflective layer 170. The third primer layer 172 can be as described above with respect to the first or second primer layers. In one non-limiting example, the third primer layer has a thickness in the range of 1 nm to 5 nm, such as 1 nm to 4 nm, such as 2 nm to 3 nm, such as 2.8 nm.

A fourth dielectric layer 174 is located over the third reflective layer (e.g., over the third primer film 172). The fourth dielectric layer 174 can be comprised of one or more metal oxide or metal alloy oxide-containing layers, such as those discussed above with respect to the first, second, or third dielectric layers 140, 150, 162. In one non-limiting example, the fourth dielectric layer 174 is a multi-film layer having a first metal oxide layer 176, e.g., a zinc oxide layer, deposited over the third primer film 172, and a second metal alloy oxide layer 178, e.g., a zinc stannate layer, deposited over the zinc oxide layer 176. In one non-limiting embodiment, the metal oxide layer 176 can have a thickness in the range of 1 nm to 10 nm, such as 2 nm to 8 nm, such as 4 nm to 8 nm, such as 5 nm to 7 nm, such as 6 nm. The metal alloy oxide layer 178 can have a thickness in the range of 5 nm to 25 nm, such as 10 nm to 25 nm, such as 15 nm to 25 nm, such as 17 nm to 20 nm, such as 18 nm to 20 nm, such as 19 nm.

In one non-limiting example, the total thickness of the fourth dielectric layer 174 (e.g., the combined thicknesses of the metal oxide and metal alloy oxide layers) is in the range of 15 nm to 30 nm, such as 20 nm to 30 nm, such as 22 nm to 26 nm, such as 24 nm to 26 nm, such as 25 nm.

An overcoat 180 can be located over the fourth dielectric layer 174. The overcoat 180 can help protect the underlying coating layers from mechanical and chemical attack. The overcoat 180 can be, for example, a metal oxide or metal nitride layer. For example, the overcoat 180 can have a thickness in the range of 2 nm to 10 nm, such as 2 nm to 8 nm, such as 3 nm to 7 nm, such as 4 nm to 6 nm, such as 4 nm to 5 nm, such as 4.5 nm to 5 nm. The overcoat 180 of the tempered coating can be thicker than the overcoat of the annealed coating. In a preferred embodiment, the overcoat 80 comprises titanic.

Application of the Invention

The invention allows a glass manufacturer to greatly simplify the supply chain for providing a glass supplier with both an annealed coated glass sheet with a non-temperable coating (for final use on the glass without further heat treatment) and a glass sheet (such as an annealed glass sheet) with a temperable coating that can be subjected to further heat treatment such as tempering, with the non-temperable coating and the tempered coating (after tempering) having similar aesthetic and optical properties. For example, the glass manufacturer can provide annealed glass sheets having the non-temperable coating of the invention to a glass supplier. These glass sheets can be made in conventional manner, such as by coating a conventional float glass ribbon with the non-temperable coating of the invention, allowing the coated glass to cool, and cutting the glass into sheets of any size desired by a customer. The glass manufacturer can also supply the glass supplier with glass sheets having the temperable coating of the invention. For example, a float glass ribbon can be coated as described above with the temperable coating of the invention. Glass sheets with the temperable coating can be supplied to the glass supplier. When a customer desires a piece of tempered coated glass of a particular dimension, the glass supplier cuts the glass sheet with the temperable coating to the desired dimensions and then tempers the cut piece in conventional manner. The resultant tempered glass piece with the tempered coating has similar aesthetic and optical characteristics as the non-tempered glass piece with the non-temperable coating, allowing the two glass pieces to be utilized in the same building while maintaining the aesthetic appearance of the building.

The following Examples illustrate various embodiments of the invention. However, it is to be understood that the invention is not limited to these specific embodiments.

EXAMPLES

In the following Examples, "T" refers to the transmittance through the article, "Rext" refers to the exterior reflectance of a standard IGU from the No. 1 surface, "flint" refers to the reflectance of the IOU from the inside (No. 4) surface, "Vis." refers to visible light, and "SHGC" refers to the solar heat gain coefficient. A "standard IGU" has an outer ply of 6 mm thick clear glass, an inner ply of 6 mm clear glass, a 0.5 inch (1.27 cm) gap filled with air, with the coating on the No. 2 surface. "S.C. silver" means "subcritical" thickness (that is, the layer was not a continuous layer but was deposited to form discontinuous coating regions).

In the following examples, all thicknesses are in nanometers unless indicated to the contrary. The coatings were deposited using a conventional Airco MSVD coater.

The color coordinates a*, b*, and L* are those of the conventional CIE (1931) and CIELAB systems that will be understood by one of ordinary skill in the art.

In order to model the response of the subcritical layer structure to electromagnetic radiation so that the optical properties of the entire stack can be optimized and controlled, the subcritical layer can be modeled as two idealized layers. These idealized layers have uniform optical properties (i.e., index of refraction (n) and extinction co-efficient (k)) through their thickness, as do the other layers in the stack. Thus, the thicknesses referred to in the examples are the thicknesses of these idealized layers and are meaningful in the context of calculating the optical response of a given coating stack containing these layers.

Also, the thickness values associated with the "subcritical" layers in the following Examples are an "effective thickness". The effective thickness can be calculated based on a reference coating speed that is slower than the actual coating speed of the commercial caster. For example, a silver layer is applied onto a substrate at the same coating rate as a commercial costar but at a reduced line speed (reference coating speed) compared to the commercial costar. The thickness of the coating deposited at the reference coating speed is measured and then the "effective thickness" for a coating deposited at the same coating rate but at the faster line speed of the commercial costar is extrapolated. For example, if a particular coating rate provides a silver coating of 25 nm at reference coating speed that is one-tenth the line speed of the commercial coater, then the "effective thickness" of the silver layer at the same coating rate but at the commercial costar line speed (i.e., ten time faster than the reference coating run) is extrapolated to be 2.5 nm (i.e., one tenth the thickness). However, as will be appreciated, the silver layer at this effective thickness (below the subcritical thickness) would not be a continuous layer but rather would be a discontinuous layer having discontinuous regions of silver material. Another way to adjust the thickness of the subcritical silver layer is to decrease the power applied to the cathode depositing that layer. For example, the costar could be set up with power supplied to the cathodes to provide known coating thicknesses. The power to the cathode for the subcritical silver layer could then be reduced and the subcritical silver layer thickness extrapolated based on the reduced power level. Or, a series of samples could be generated at different power levels until a desired L*, a*, and b* is achieved.

Example 1

A non-temperable coating was deposited by a conventional MSVD costar (commercially available from Applied Materials) on a 6 mm piece of clear float glass (annealed glass). The coated glass had the following structure:

| | |
|---|---|
| titania | 4.5 nm |
| zinc stannate | 18 nm |

-continued

| | |
|---|---|
| zinc oxide (90/10) | 8 nm |
| titanium | 7 nm |
| silver | 14.1 nm |
| zinc oxide | 4 nm |
| zinc stannate | 34 nm |
| zinc oxide | 5 nm |
| titanium | 3 nm |
| S.C. silver | 1.6 nm |
| Zinc oxide | 5 nm |
| zinc stannate | 29 nm |
| zinc oxide | 7 nm |
| titanium | 3 nm |
| silver | 14.1 nm |
| zinc oxide | 6 nm |
| zinc stannate | 23 nm |
| clear glass | 6 mm |

This coated glass article was incorporated into a standard IGU as the outer ply (the inner ply was uncoated 6 mm clear glass). The measured solar control values are set forth in Table 1 below and the optical characteristics are set forth in Table 2 below.

TABLE 1

| Vis. T | Vis. Rext | Vis. Rint | Solar T | Solar Rext | Solar Rint | UV T | SC | SHGC |
|---|---|---|---|---|---|---|---|---|
| 54.0 | 19.3 | 16.1 | 24.5 | 37.3 | 33.6 | 11.2 | 0.335 | 0.2918 |

TABLE 2

| Trans. L* | Trans. a* | Trans. b* | Ref. Ext L* | Ref. Ext a* | Ref. Ext b* | Ref. Int. L* | Ref. Int. a* | Ref. Int b* |
|---|---|---|---|---|---|---|---|---|
| 78.59 | −6.82 | 0.86 | 51.15 | −2.83 | −6.95 | 47.38 | −6.63 | −7.51 |

Example 2

A temperable coating was deposited by a conventional Airco MSVD coater on a 6 mm piece of clear float glass. The coated glass had the following structure:

| | |
|---|---|
| titania | 5 nm |
| zinc stannate | 19 nm |
| zinc oxide | 6 nm |
| titanium | 2.8 nm |
| silver | 14.8 nm |
| zinc oxide | 3 nm |
| zinc stannate | 32 nm |
| zinc oxide | 4 nm |
| titanium | 2.1 nm |
| S.C. silver | 1.75 nm |
| Zinc oxide | 6 nm |
| zinc stannate | 36 nm |
| zinc oxide | 6 nm |
| titanium | 3 nm |
| silver | 14.8 nm |
| zinc oxide | 7 nm |
| zinc stannate | 20 nm |
| clear glass | 6 mm |

This coated glass article was tempered and incorporated into a standard IGU as the outer ply (the inner ply was uncoated 6 mm Starphire® glass). The measured solar control values are set forth in Table 3 below and the optical characteristics are set forth in Table 4 below.

TABLE 3

| Vis. T | Vis. Rext | Vis. Rint | Solar T | Solar Rext | Solar Rint | UV T | SC | SHGC |
|---|---|---|---|---|---|---|---|---|
| 54.8 | 18.6 | 15.9 | 24.5 | 37.7 | 34.1 | 16.1 | 0.333 | 0.2900 |

TABLE 4

| Trans. L* | Trans. a* | Trans. b* | Ref Ext. L* | Ref Ext. a* | Ref Ext. b* | Ref Int. L* | Ref Int. a* | Ref Int. b* |
|---|---|---|---|---|---|---|---|---|
| 78.99 | −5.88 | 0.65 | 50.42 | −2.44 | −8.45 | 47.02 | −5.48 | −7.47 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An architectural transparency, which is non-tempered, comprising:
    a) a first ply, comprising:
    an annealed glass substrate; and
    a coating stack over at least a portion of the substrate, the coating stack comprising:
    a first dielectric layer;
    a first continuous metal layer over at least a portion of the first dielectric layer;
    a first primer layer over the first continuous metal layer;
    a second dielectric layer over at least a portion of the first primer layer;
    a second discontinuous metal layer over at least a portion of the second dielectric layer;
    a second primer layer over at least a portion of the second discontinuous metal layer, wherein the second primer layer comprises titania;
    a third dielectric layer over at least a portion of the second primer layer;
    a third continuous metal layer over at least a portion of the third dielectric layer;
    a third primer layer over at least a portion of the third continuous metal layer; and
    an outermost protective coating over at least a portion of the third primer layer, wherein the protective coating comprises titania having a thickness in the range of 4 nm to 6 nm;
    b) a second, transparent or translucent ply;
    c) a spacer frame spacing the first ply and the second ply apart, the first ply, the second ply, and the spacer frame defining a chamber; and
    d) a gas within the chamber.

2. The architectural transparency of claim 1, wherein the second discontinuous metal layer has an effective thickness in the range of 1 nm to 2 nm.

3. The architectural transparency of claim 2, wherein the second discontinuous metal layer has an effective thickness in the range of 1.5 nm to 1.7 nm.

4. The architectural transparency of claim 2, wherein the second primer layer has a thickness in the range of 3 nm to 3.5 nm.

5. The architectural transparency of claim 2, wherein the protective coating has a thickness in the range of 4 nm to 5 nm.

6. The architectural transparency of claim 1, wherein the second discontinuous metal layer comprises silver having an effective thickness in the range of 1.5 nm to 1.7 nm, wherein the second primer layer comprises titania having a thickness in the range of 3 nm to 3.5 nm, and wherein the protective coating comprises titania having a thickness in the range of 4 nm to 5 nm.

7. The architectural transparency of claim 1, wherein the gas is argon or krypton.

8. The architectural transparency of claim 1, wherein the coating stack of the first ply is on a side of the first ply facing the chamber.

9. An architectural transparency, which is non-tempered, comprising:
    a) a first ply, comprising:
    an annealed glass substrate; and
    a coating stack over at least a portion of the substrate, the coating stack comprising:
    a first dielectric layer;
    a first continuous metal layer over at least a portion of the first dielectric layer;
    a first primer layer over the first continuous metal layer;
    a second dielectric layer over at least a portion of the first primer layer;
    a second discontinuous metal layer over at least a portion of the second dielectric layer;
    a second primer layer over at least a portion of the second discontinuous metal layer;
    a third dielectric layer over at least a portion of the second primer layer;
    a third continuous metal layer over at least a portion of the third dielectric layer;
    a third primer layer over at least a portion of the third continuous metal layer; and
    an outermost protective coating over at least a portion of the third primer layer, and
    wherein the coating is a non-temperable coating,
    wherein the second discontinuous metal layer has effective thickness in the range of 1.5 nm to 1.7 nm;
    b) a second, transparent or translucent ply;
    c) a spacer frame spacing the first ply and the second ply apart, the first ply, the second ply, and the spacer frame defining a chamber; and
    d) a gas within the chamber.

10. The architectural transparency of claim 9, wherein the second primer layer has a thickness in the range of 3 nm to 3.5 nm.

11. The architectural transparency of claim 9, wherein protective coating has a thickness in the range of 4 nm to 5 nm.

12. The architectural transparency of claim 9, wherein the second discontinuous metal layer comprises silver, the second primer layer comprises titania having a thickness in the range of 3 nm to 3.5 nm, and the protective coating comprises titania having a thickness in the range of 4 nm to 5 nm.

13. An architectural transparency, which is non-tempered, comprising:
    a) a first ply, comprising:
    an annealed glass substrate; and
    a coating stack over at least a portion of the substrate, the coating stack comprising:
    a first dielectric layer comprising an oxide or alloy oxide including zinc;

a first continuous metal layer comprising silver over at least a portion of the first dielectric layer;
a first primer layer comprising titanium over the first continuous metal layer;
a second dielectric layer comprising an oxide or alloy oxide including zinc over at least a portion of the first primer layer;
a second discontinuous metal layer comprising silver having an effective thickness in the range of 1 nm to 3 nm over at least a portion of the second dielectric layer;
a second primer layer comprising titanium over at least a portion of the second discontinuous metal layer, wherein the second primer layer comprises titania;
a third dielectric layer comprising an oxide or alloy oxide including zinc over at least a portion of the second primer layer;
a third continuous metal layer comprising silver over at least a portion of the third dielectric layer;
a third primer layer comprising titanium over at least a portion of the third continuous metal layer;
a fourth dielectric layer comprising an oxide or alloy oxide including zinc over at least a portion of the third primer layer; and
an outermost protective coating over at least a portion of the third primer layer, wherein the protective coating comprises titania having a thickness in the range of 4 nm to 6 nm;
b) a second, transparent or translucent ply;
c) a spacer frame spacing the first ply and the second ply apart, the first ply, the second ply, and the spacer frame defining a chamber; and
d) a gas within the chamber.

* * * * *